United States Patent
Murata et al.

(10) Patent No.: US 6,185,073 B1
(45) Date of Patent: Feb. 6, 2001

(54) ROTARY MAGNETIC HEAD HAVING HEAD BASE WHICH IS BENT ALONG THERMAL PLASTIC DEFORMATION LINE

(75) Inventors: Akio Murata, Ibaraki; Hideaki Mukae, Sanda; Takaaki Maegawa, Neyagawa; Masaru Higashionji, Katano; Toshiharu Okada, Ibaraki, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/427,587

(22) Filed: Apr. 24, 1995

Related U.S. Application Data

(62) Division of application No. 08/205,726, filed on Mar. 4, 1994, now Pat. No. 5,450,256, which is a division of application No. 07/798,601, filed on Nov. 26, 1991, now Pat. No. 5,341,256.

(30) Foreign Application Priority Data

Nov. 27, 1990 (JP) .................................................. 2-328703
Jul. 15, 1991 (JP) .................................................. 3-173611
Jul. 24, 1991 (JP) .................................................. 3-184473

(51) Int. Cl.[7] ........................................................ G11B 5/53
(52) U.S. Cl. ............................................ 360/254.8; 360/255
(58) Field of Search .............................. 360/85, 104–105, 360/107, 109

(56) References Cited

U.S. PATENT DOCUMENTS

| | | | |
|---|---|---|---|
| 4,203,140 | * 5/1980 | Watanabe | 360/109 |
| 4,507,696 | 3/1985 | Hütter | 360/109 |
| 4,814,908 | 3/1989 | Schmitz | 360/109 |
| 5,065,267 | 11/1991 | Yohda | 360/104 |
| 5,303,108 | 4/1994 | Higashionji et al. | 360/107 |
| 5,341,256 | 8/1994 | Murata | 360/109 |
| 5,347,415 | 9/1994 | Murata et al. | 360/109 |

FOREIGN PATENT DOCUMENTS

| | | |
|---|---|---|
| 0093886 | 11/1983 | (EP) . |
| 3421219 | 12/1985 | (EP) . |
| 0185844 | 7/1986 | (EP) . |
| 59-203272 | 11/1984 | (JP) . |
| 61-189463 | 11/1986 | (JP) . |
| 62-93028 | 4/1987 | (JP) . |
| 62-134118 | 6/1987 | (JP) . |
| 1-227279 | 9/1989 | (JP) . |
| 4-310613 | 11/1992 | (JP) . |

OTHER PUBLICATIONS

Patent Abstracts of Japan, vol. 8, No. 278 (P–322)(1715) Dec. 19, 1984 & JP–A–59 144 030 (Sony K.K) Aug. 17, 1990.
Patent Abstracts of Japan, vol. 14, No. 321 (P–1074)(4264) Jul 10, 1990 & JP–A–2 105 318 (Topcon Corp.) Apr. 17, 1990.
Proceedings of Lamp '87, Osaka (May, 1987), "Laser Forming of Metals and Alloys", Yoshiharu Namba, pp. 601–606.
Rikohgaku–sha, "Welding Engineering", First Edition, May 11, 1989, with Summary and translation of pp. 80–84. (Partial Translation).

\* cited by examiner

*Primary Examiner*—George J. Letscher
(74) *Attorney, Agent, or Firm*—Wenderoth, Lind & Ponack, L.L.P.

(57) ABSTRACT

A head base has at least one head chip fixed thereto. A position of the head chip is adjusted to a predetermined position by applying a laser beam to the head base to cause plastic deformation of the head base. Appropriate laser radiation conditions are set depending upon a necessary amount of positional adjustment of the head chip fixed to the head base.

5 Claims, 10 Drawing Sheets

ROTARY MAGNETIC HEAD HAVING HEAD BASE WHICH IS BENT ALONG THERMAL PLASTIC DEFORMATION LINE

This is a Divisional application of application Ser. No. 08/205,726, now U.S. Pat. No. 5,450,256 filed Mar. 4, 1994, which in turn is a Divisional of application Ser. No. 07/798,601, filed Nov. 26, 1991 and now U.S. Pat. No. 5,341,256.

BACKGROUND OF THE INVENTION

FIELD OF THE INVENTION

This invention relates to an apparatus for adjusting a position of a rotary head in a magnetic recording/reproducing apparatus such as a video cassette recorder (VCR).

As shown in FIGS. 1A and 1B, recent high quality consumer VCRs have several rotary heads 1 on a rotary drum 2 for recording video signals, high fidelity audio signals and for erasing recorded tracks. All heads are bonded on small metal plates 3a, called a head base, and the rotary drum 2 is mounted on a fixed drum 4.

All heads should be precisely positioned on a rotary drum 2 in order to satisfy the desired recording format on the tape, because the arrangement of recorded tracks are mainly determined by the head positions on the rotary drum. The head position includes absolute head height Ha which is the distance between a datum plane 5 of the fixed drum 4 and a track edge 6 of the head 1, relative head height Hr which is the relative head height among the track edges of different heads, and gap azimuth angle 31 of the head 1.

The conventional manner of adjusting the head position is as follows:

Consumer VTRs are not provided with a mechanism for adjusting the azimuth angle, and the angle is adjusted in the manufacturing process of the head when cutting out the chip from the gapped bar. Therefore, the precision of azimuth angle depends on the machining precision and the precision of adhering the head 1 to the head base 3a with an adhesive 8.

On the other hand, to adjust the head height, first the height H0 of each head from the surface (the head adhesion surface) of the head base 3a of the track edge 6 is measured, and the absolute height Ha of each head is roughly adjusted by placing a metal plate 9 called a shim having a thickness corresponding to a required adjusting amount on the basis of the measured H0 value between the head base 3a and the rotary drum 2, and each head is fixed to the rotary drum with screws.

Consequently, the rotary drum 2 on which the heads are mounted is fixed on the fixed drum 4, and the relative height of the heads is precisely adjusted using a screw 10 of which a tip is contacting with a part of the head base as shown in FIG. 1b. More specifically, by tightening or loosening the screw 10, the head base is elastically deformed, and the head chip adhered to the tip of the head base is moved vertically in the head height direction (the direction parallel to the rotary shaft A of the rotary drum) as indicated by arrow B in the drawing and Ha and Hr are adjusted precisely. However, since the fluctuations of the tip shape of the screw 10 are significant and the height is changed as much as 500 microns by turning the screw 10 by a revolution, the precise adjustment of the height in the sub-micron order is not realized.

The basis of the above conventional technique is the mechanical deformation of the head base by pushing a small screw within its elastic limits. Accordingly, when the drum unit is subjected to vibratory or temperature changing circumstances, the small screw pushing the head base may be loosened and the head height may be fluctuated.

In our experiments, in an ambient temperature cycle test of −40 degrees and +80 degrees and a vibration test, it was found that the fluctuations of the relative head height were about 2 microns.

The influence of the above fluctuations on the reproduced picture qualities is very severe, especially in the long play mode, for example, the six-hour mode in the VHS system of narrow track recording, because the above fluctuations will cause tracking errors and decrease of reproducing voltage and increase of cross talk interference from adjacent tracks.

Furthermore, if a fluid bearing is adopted as the bearing of the rotary head drum, the yawing of the rotary head drum during rotating depends on the rotation of the rotary drum. It indicates that the absolute head height, relative head height and azimuth angle also depend on the rotation of the rotary head drum. Consequently, by the conventional head adjusting method, in which the head position should be adjusted without rotating the drum, it is very difficult to guarantee a high adjustment accuracy.

SUMMARY OF THE INVENTION

It is hence a primary object of the invention to present an apparatus and an appropriate rotary head for adjusting the head position without being influenced by vibrations and ambient temperature changes.

In order to attain the above object, a rotary head adjuster of the invention comprises stage means, measuring means, laser means, and control means. The stage means is connected to the control means, and possesses a function of fixing the rotary head composed of plural head chips itself or the drum unit mounting the rotary head to a movable stage unit, and a function of adjusting a laser beam irradiation position by moving the stage so that a laser beam may be accurately applied to an appropriate position of the rotary head according to a control command from the control means.

The measuring means is connected to the control means, and it possesses a function of measuring relative positions of plural head chips, and a function of transmitting results of measurement to the control means.

The laser means is also connected to the control means, and it possesses a function of oscillating and emitting a laser beam corresponding to a required adjustment amount of a position of each head chip, according to a control command relating to a laser irradiation condition from the control means.

The control means is connected to the measuring means, the stage means, and the laser means, and it possesses a function of calculating the required adjustment amount of individual head chips by comparing desired relative positions with the results of measurement of the individual head chip positions received from the measuring means, and determining adequate laser irradiation conditions for realizing a plastic deformation of the head base depending on the obtained required adjustment amount (for example, laser power, pulse width, irradiation position, and irradiation sequence) according to a specified algorithm, and a function of controlling the other means connected depending on the obtained irradiation conditions.

According to this invention, since the rotary head is adjusted by means of plastic deformation, which is not susceptible to influence of vibrations and ambient temperature changes, high accuracy head positioning is realized. According to this invention, since no screws for adjusting the head positions are required, it has advantages in production costs.

Furthermore, according to this invention, enabling to apply a laser beam to a head base while rotating the head drum, the rotary head can be adjusted precisely even if the fluid bearing is adopted as a bearing of a rotary drum.

The invention also includes a rotary head itself adjusted by the above device.

DESCRIPTION OF THE PREFERRED EMBODIMENTS

Figure 1A:
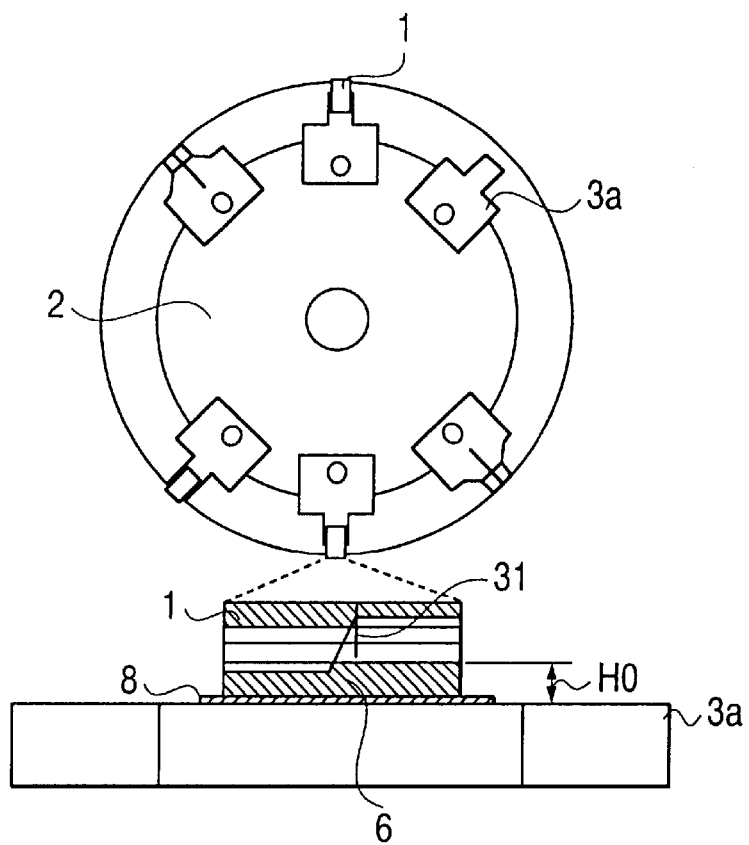
FIGS. 1A and 1B are diagrams for explaining the prior art, FIG. 1A being a bottom view of a rotary drum mounting a rotary head and a magnified view of the head from its gap side direction, and FIG. 1B being a side view of a drum unit having the rotary drum of FIG. 1A fixed on the fixed drum.
Figure 1B:
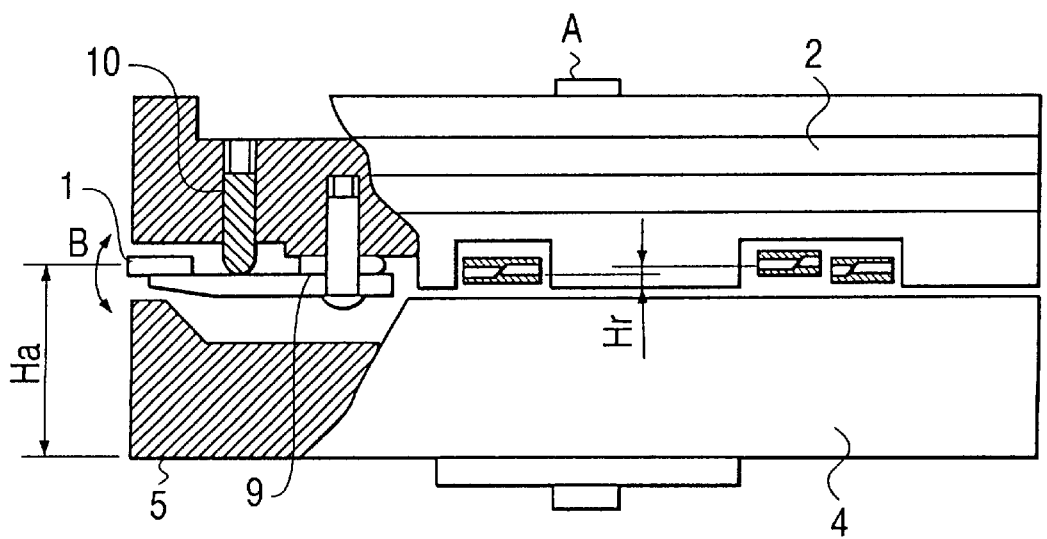
Figure 2:
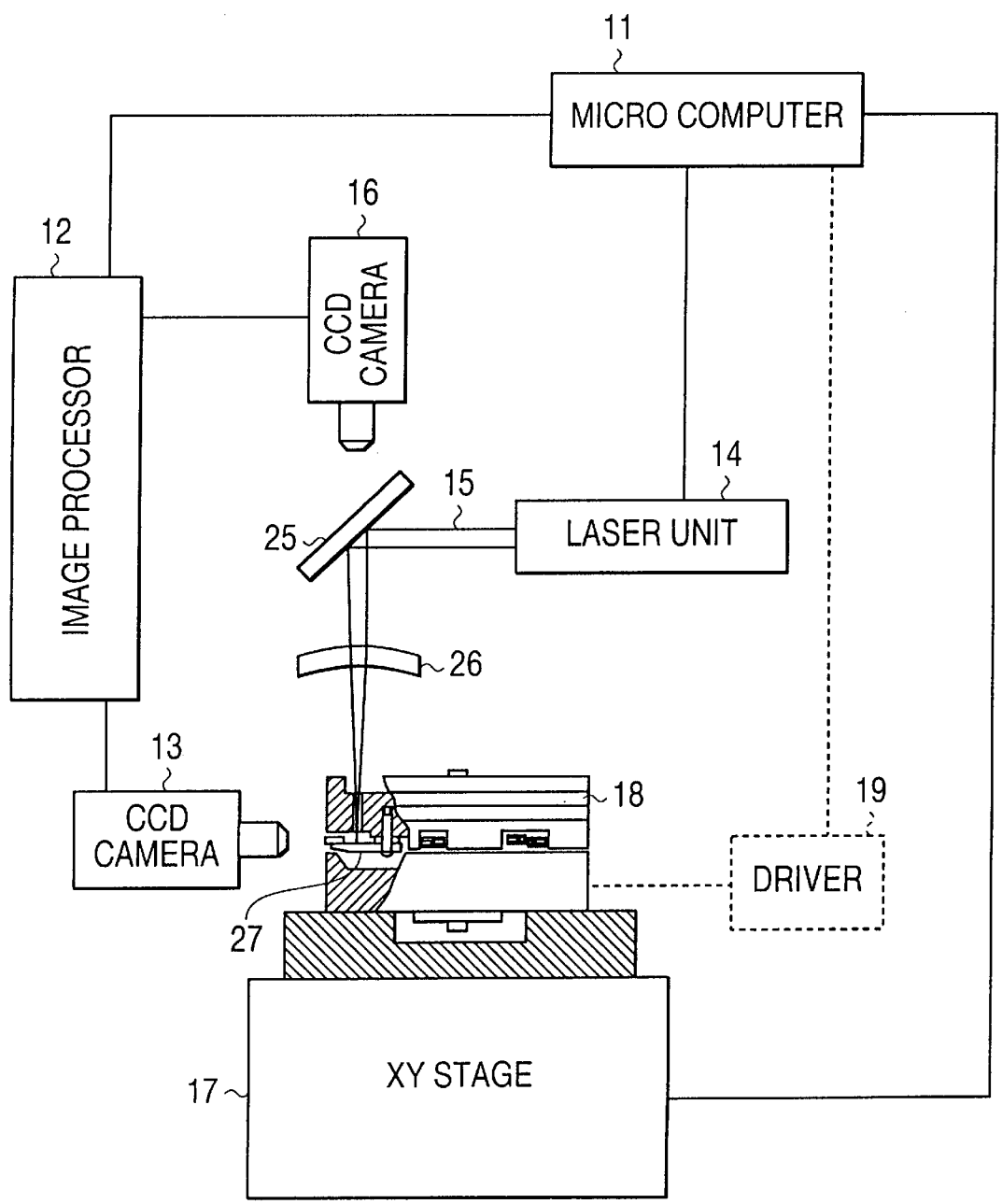
FIG. 2 is a functional block diagram of an apparatus for adjusting the head position in the drum unit state fixing the rotary head on the rotary drum in a preferred embodiment of the invention.

As shown in FIG. 2, an apparatus for adjusting a position of a rotary head comprises a microcomputer 11, an image processor 12, a CCD camera 13 for taking an image of a head gap surface, a laser unit 14 for emitting a YAG laser beam 15 which is excited and reflected by a mirror 25 and focused to illuminate a head base 27 of the rotary head by a focusing lens 26, a CCD camera 16 for monitoring the head base where a laser beam is applied, and a stage 17 fixing the rotary head drum unit 18. Meanwhile, the drum unit 18 employs a fluid bearing, and the rotary drum is designed to be rotated by a driver circuit 19. From the driver circuit, a signal synchronized with the rotation is generated, and this synchronous signal is sent to the microcomputer 11.

The stage 17 comprises two stepping motor stages for moving the rotary head drum with heads in order to apply a laser beam to a proper point on the head base. The movement of the stage 17 is controlled by the microcomputer 11.

The microcomputer 11 is connected to the laser unit 14 for emitting the YAG pulse laser; beam wavelength being 1.06 $\mu$m, by sending a laser ON signal synchronized with the rotation of the drum. Also, the laser irradiation conditions are sent to the laser unit 14 from the microcomputer 11.

The image of a gap surface during rotation of the drum is observed as a still picture by the CCD camera 13 using the synchronous signal synchronized with rotation sent from the microcomputer 11, and the video signal of the still picture is sent to the image processor 12. Then, the image is stored in the image processor 12. The head positions such as absolute head height, relative head height and azimuth angle are obtained by processing the brightness of the image divided into some gray levels. The precision of the above measurement is about 0.06 $\mu$m. The measured data are sent to the microcomputer 11, and compared with data indicative of desired head positions to determine a required amount of adjustment.

The proper laser irradiation conditions corresponding to the required adjustment are obtained by using a preprogrammed algorithm in the microcomputer 11. The algorithm is based on some experimental results described below.

Referring first to FIG. 3, the principle of head position adjustment by irradiation of a laser beam is explained below. As shown in FIG. 3, in the head bases 3a, 3b, grooves 21a, 21b are formed between penetration holes 20a, 20b for fixing the rotary heads and head chips 1a, 1b.

Figure 3A:
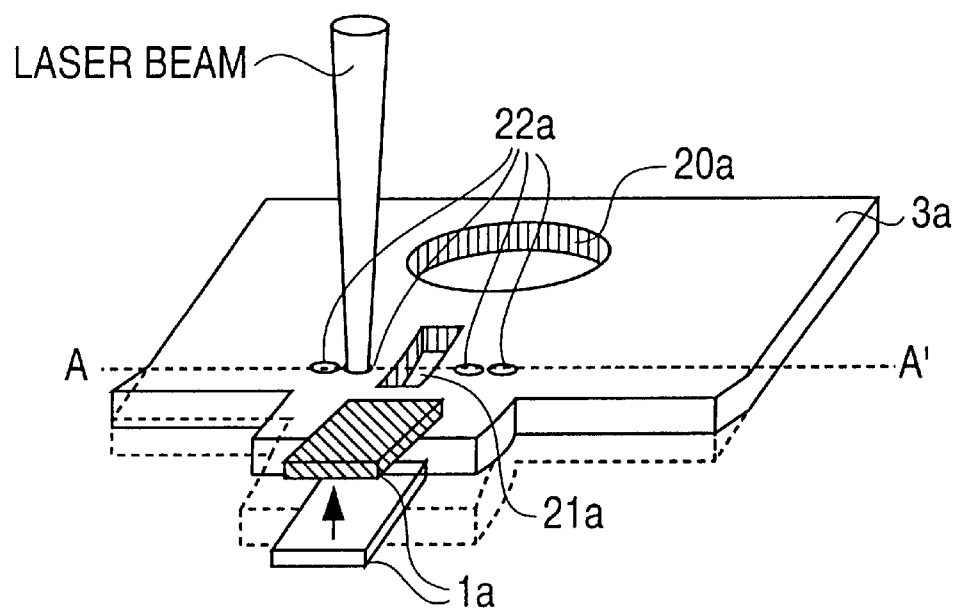
FIGS. 3A and 3B are diagrams for explaining the principle of the head position adjusting method by irradiation with a laser beam of the invention.

In FIG. 3A, the laser beam is emitted on a line of wave line AA' other than the groove part 21a, and the illuminated part 22a rises in temperature by energy of the laser beam, thereby causing plastic deformation. This plastic deformation part 22a induces a concave deformation of the head base 3 on the irradiation side on the boundary of the wave line AA' when restrained from the surroundings in the cooling process and cooled to room temperature.

Figure 3B:
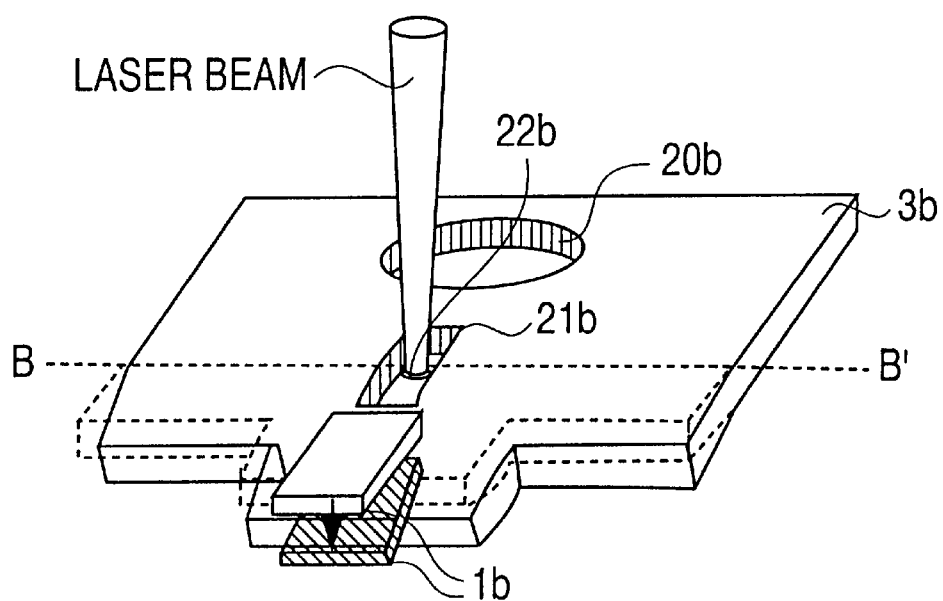

In FIG. 3B, the laser beam is emitted to the bottom of the groove part 21b, and the illuminated part 22b is raised in temperature by the energy of the laser beam, thereby causing plastic deformation. This plastic deformation part 22b is restrained from the surroundings in the cooling process in same way as in the case in FIG. 3A. This plastic deformation part, however, induces a convex deformation of the head base 3b on the irradiation side, contrary to the case above, on the boundary of the wave line BB' when cooled to room temperature because the plate thickness is less than half.

Figure 4:
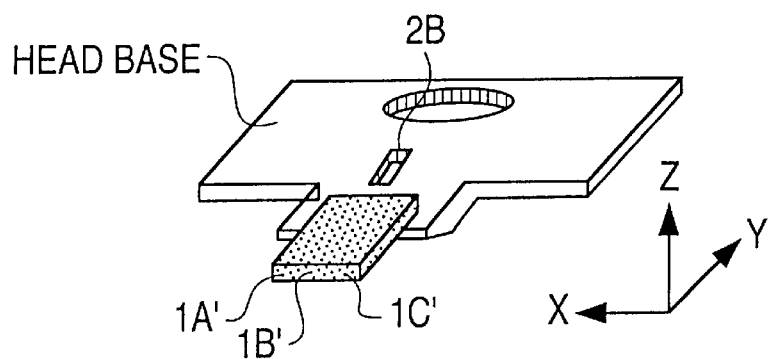
FIG. 4 is a diagram showing the dependence of the head position changes on the plate thickness of the groove part when emitting a laser beam to the concave groove part on the head base.
Figure 4:
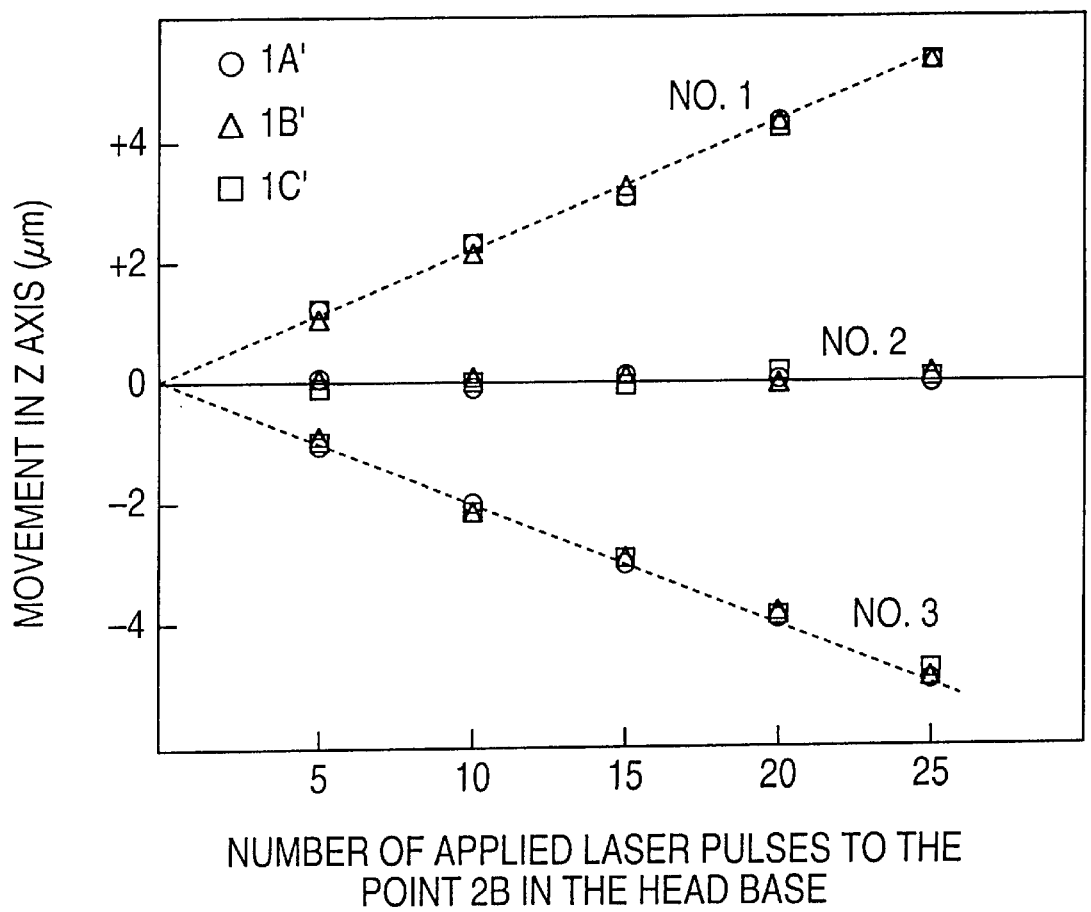

FIG. 4 shows the relation between the groove part plate thickness and the head base deformation. The energy of the emitted laser beam is an Nd YAG pulse laser of wavelength 1.06 microns with 1 joule per pulse. The rotary heads No. 1, No. 2, No. 3 have a groove part plate thickness of 70%, 50%, 30% as compared with the thickness of the head base itself. The axis of ordinates in the diagram denotes the results of measurement of position changes in the z-axis direction in the diagram of the points 1A', 1B', 1C' of the head gap surface, and the axis of abscissas represents the number of irradiations of the laser beam to the groove part 21b. As understood from this diagram, the deformation direction of the head base varies depending on the plate thickness of the groove part. When the plate thickness of the groove part is less than half the plate thickness of the head base itself, a convex deformation is induced on the irradiation side by the irradiation to the groove part bottom surface. Further, since all points on the head gap surface show a change in position by a same amount, it is known that the azimuth angle is not changed by irradiation on the groove part bottom surface, and that only the z-axis, that is, the head height direction is changed.

Figure 5:
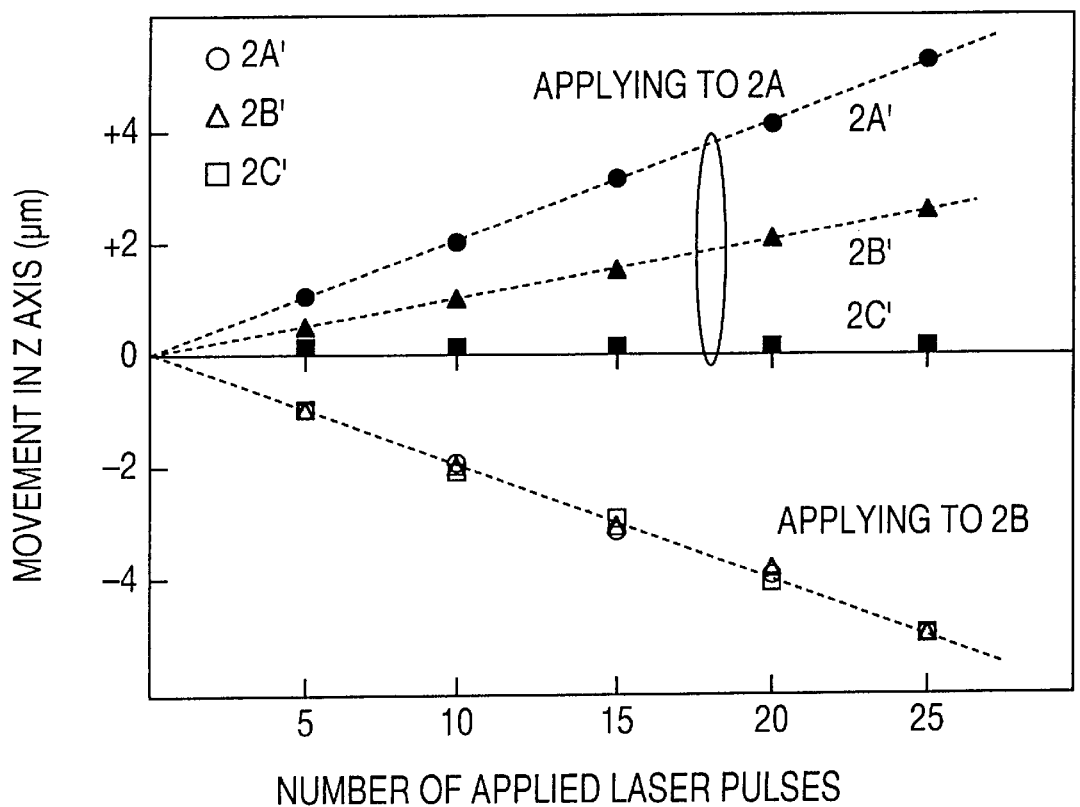
FIG. 5 is a diagram showing the relation between the irradiation position of a laser beam and the position changes of the head.

FIG. 5 shows the changes of head positions when applying YAG laser pulses to the points 2A or 2B on the head base 9b with the power of 1 joule per pulse for several times. The thickness at the pit portion 2B was less than a half of the head base 9b. As shown in FIG. 5, by applying the laser pulses to the point 2A, the points 2A' and 2B' move into the "plus" direction in the z-axis about 0.2 $\mu$m and 0.1 $\mu$m per laser pulse respectively, but the position change of the point 2C' was small enough to be ignored as compared with the others. Similarly, when applying laser pulses to the point 2C, the points 2C' and 2b'' move into the "plus" direction in the z-axis about 0.2 $\mu$m and 0.1 $\mu$m per laser pulse respectively, but the position change of the point 2A' was small enough to be ignored as compared with the others. As mentioned above, the changes at both side edges of a head, such as 2A' and 2C' are not the same, but stable. As a head 9a having a width of 2 mm, the different change at side edges of about 0.2 $\mu$m per laser pulse causes a head rotating corresponding to the change of 20 seconds in azimuth angle. It indicates that, by applying a laser pulse to the point 2A or 2C, about 0.1 $\mu$m in head height and 20 seconds in azimuth angle can be adjusted.

Furthermore, by applying a laser pulse to both points 2A and 2C, it was found that about 0.2 $\mu$m in head height can be adjusted without varying the azimuth angle.

On the other hand, as shown in FIG. 5, by applying laser pulses to the point 2B, each of three points in a head, 2A', 2B' and 2C', moves into the "minus" direction in the z-axis about 0.2 $\mu$m per pulse. Accordingly, it is possible to compensate the over-adjustment into the "plus" direction in z-axis without any changes in the azimuth angle.

Here, the important fact obtained through the above results is that the changes in head positions per laser pulse are dependent not only on the point where a laser pulse is applied to and the number of the laser pulse applying times but also the power of the laser pulse.

Figure 6:
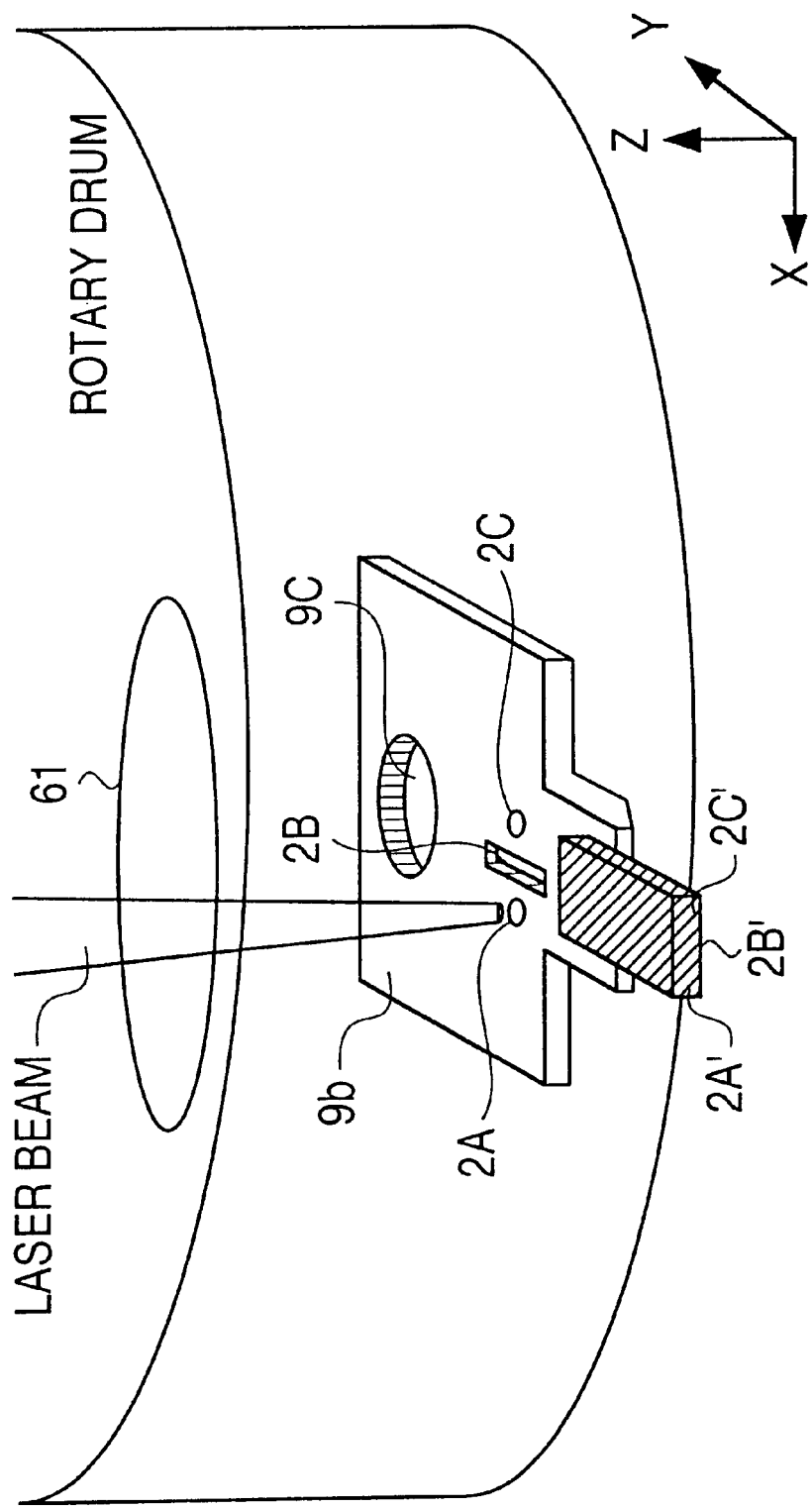
FIG. 6 is a partially magnified view around the rotary head of the head position adjusting apparatus of the invention.

As mentioned above, the adjusting algorithm adopted in the preferred embodiment includes calculating the proper laser irradiation conditions and determining the point to which the laser pulse is applied, corresponding to the required adjustment in head height and azimuth angle of head. As shown in FIG. 6, with the rotary head possessing the groove part actually fixed on the rotary drum, the laser irradiation is conducted through a penetration hole 61 opened in the rotary drum.

The head position adjusting process in the preferred embodiment comprises:

1. inputting the desired head position data to the microcomputer;
2. measuring all of the head positions fixed on the rotary head drum by processing the images of all head gap surfaces taken with the drum rotating;
3. determining the proper laser irradiation conditions and the point to which the laser pulse is applied on the head base by the microcomputer according to the preset algorithm;
4. moving the stage for adjusting the head drum in order to apply the laser pulse to an appropriate point on the head base;
5. applying the laser pulses to the head base with the drum rotating; and repeating the operations 3 through 5 until all rotary heads are adjusted to the desired head positions.

ALTERNATIVE EMBODIMENTS

Figure 7:
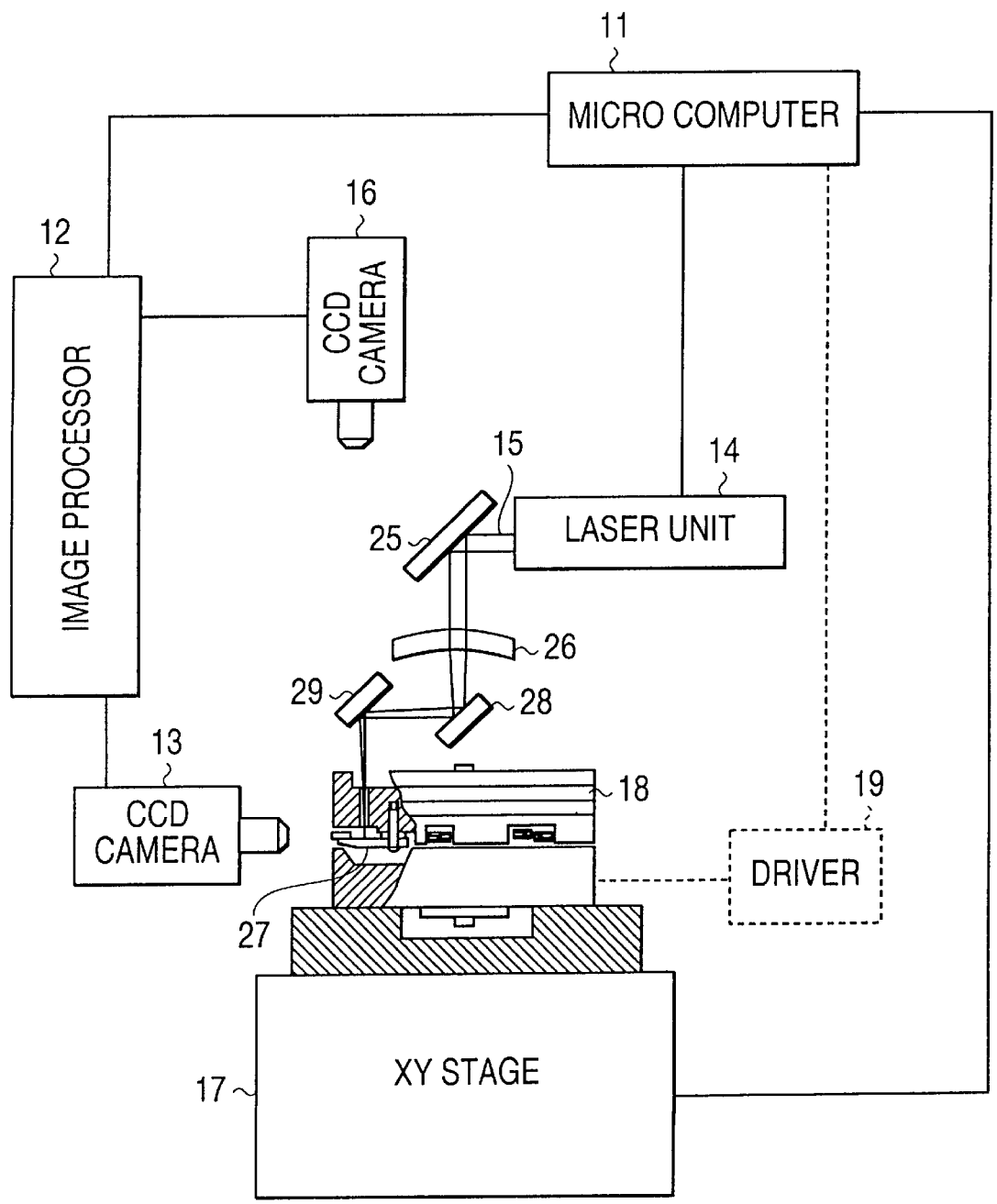
FIGS. 7 and 8 are is a functional constitutional diagram of an apparatus for adjusting the head position in other preferred embodiments of the invention.

In the apparatus for adjusting the head position in the foregoing preferred embodiment, it is intended to adjust the head position in the drum unit using a fluid bearing in the rotary drum, and therefore measurement of head position and irradiation of the laser beam are conducted while the drum is rotating. In another apparatus for adjusting the position of a head by emitting a laser beam while the drum is rotating, for example as shown in FIG. 7, two mirrors 28, 29 are disposed between a focusing lens 26 and the rotary head, and the mirrors 28, 29 are rotated in synchronism with the rotation of the drum so that the optical axis of the laser beam may always be directed right on the head base to be irradiated.

Figure 8:
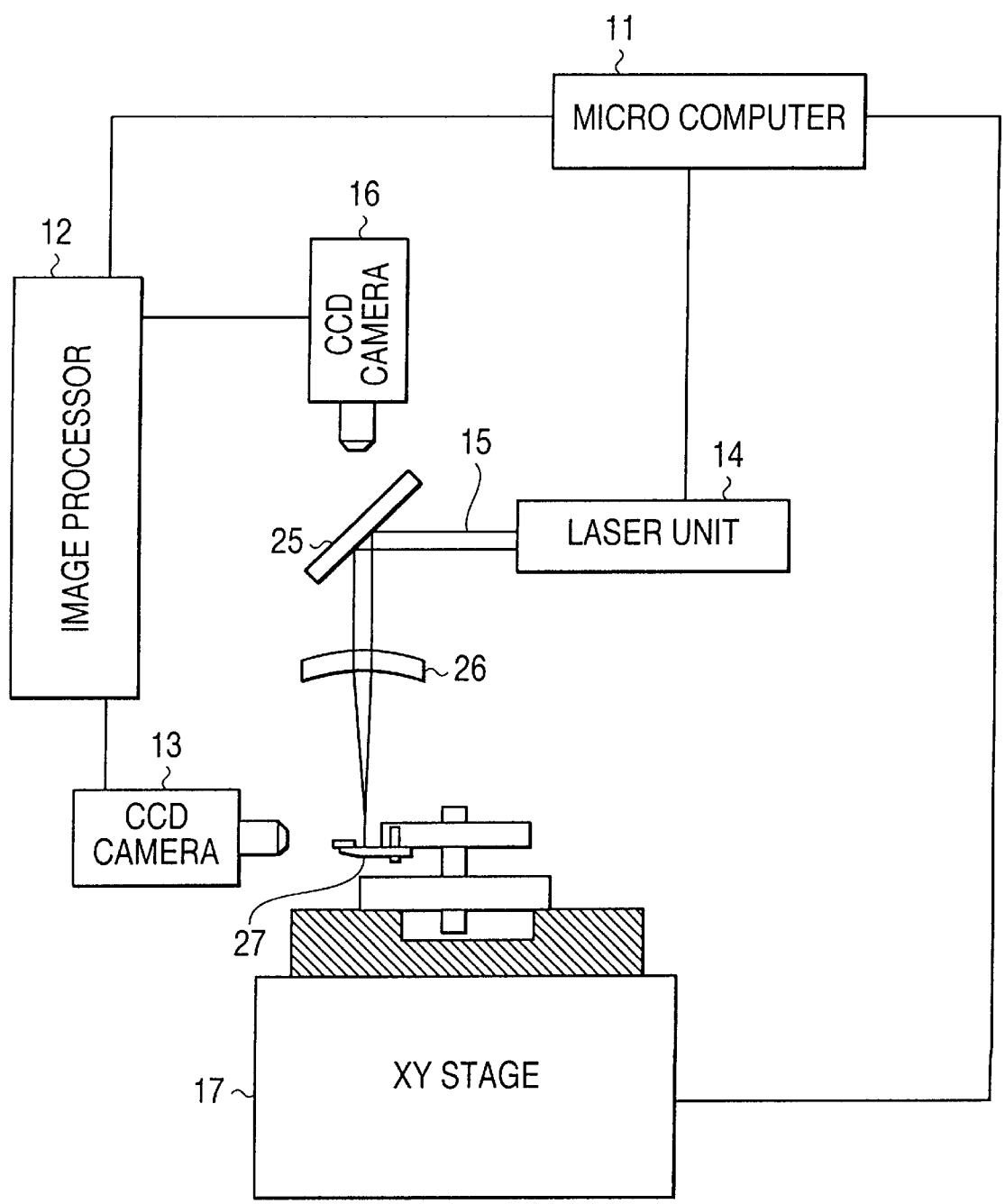

Alternately in adjustment of head position in a drum unit using a ball bearing, instead of a fluid bearing, in the rotary drum, the measurement and irradiation may be done while the rotary drum is stopped still, and the apparatus for adjustment is only the constitution shown in FIG. 8 excluding the driver block enclosed by broken line in the constitution in FIG. 2.

Moreover, instead of the hitherto explained case of adjusting the head position by laser beam irradiation in the state of being installed in the rotary drum, it is also possible to adjust the position by the rotary head alone before fixing the rotary head on the drum.

Figure 9:
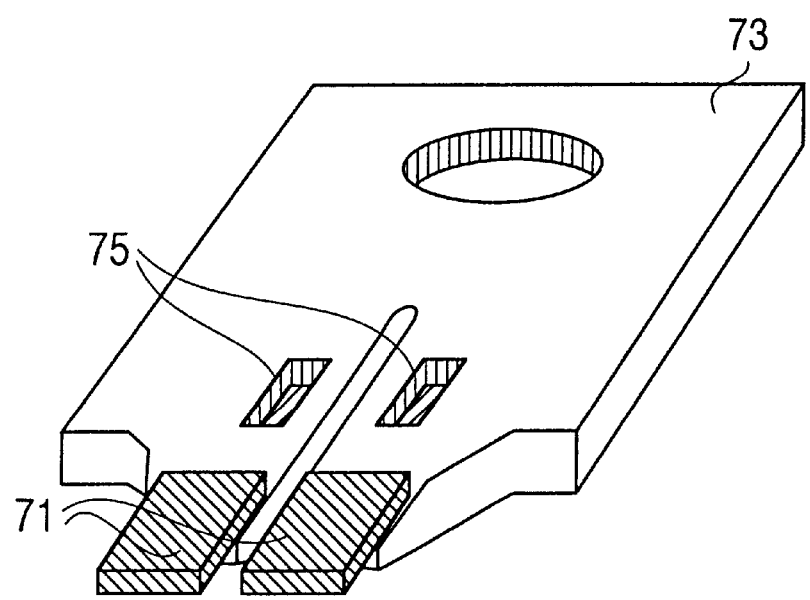
FIG. 9 is a diagram illustrating multi-head units used for multi-channel recording.
Figure 9:
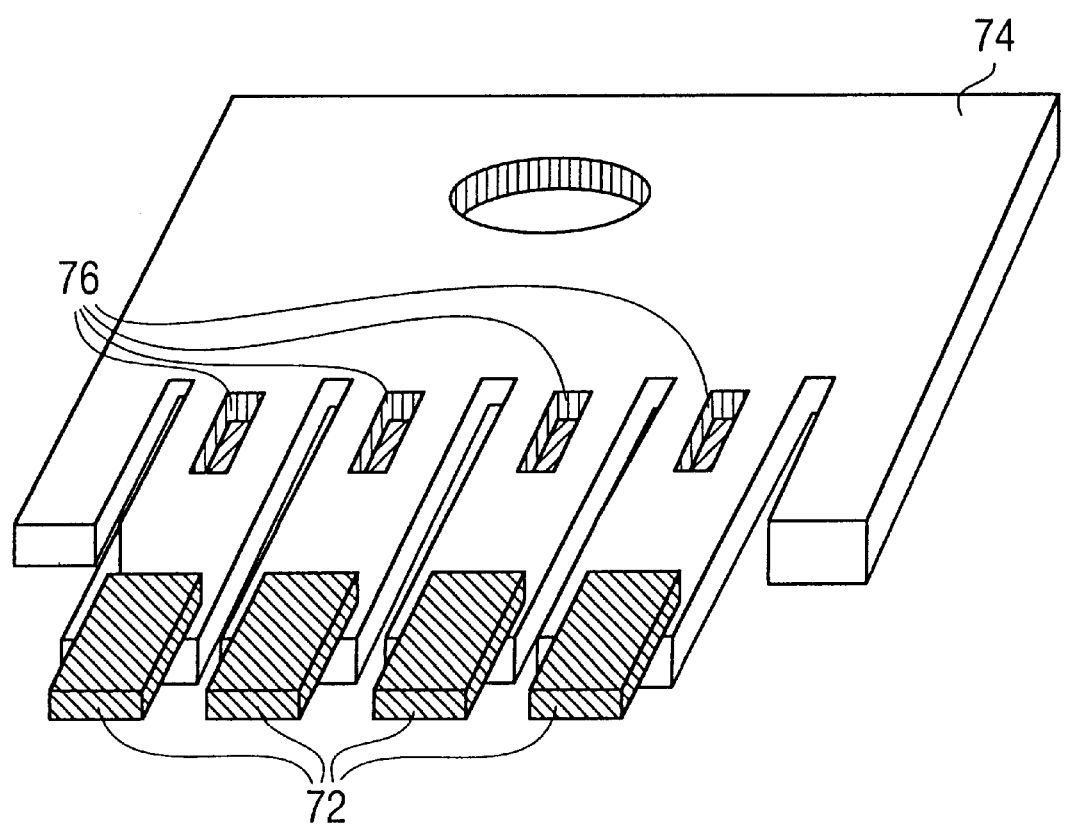

For example, in the multi-head units for multi-channel recording as shown in FIG. 9, at least two heads 71, 72 may be bonded on each one of head bases 73, 74. In such a case, in respect to the production cost, it is preferable that the adjustment of relative head height among all heads bonded on one head should be carried out before the head bases are fixed on the rotary head drum. Here, in order to adjust the relative head height in one head base, the head base should have pits 75, 76 in a number which is (at least) as many as the number of heads bonded as shown in FIG. 9.

Figure 10:
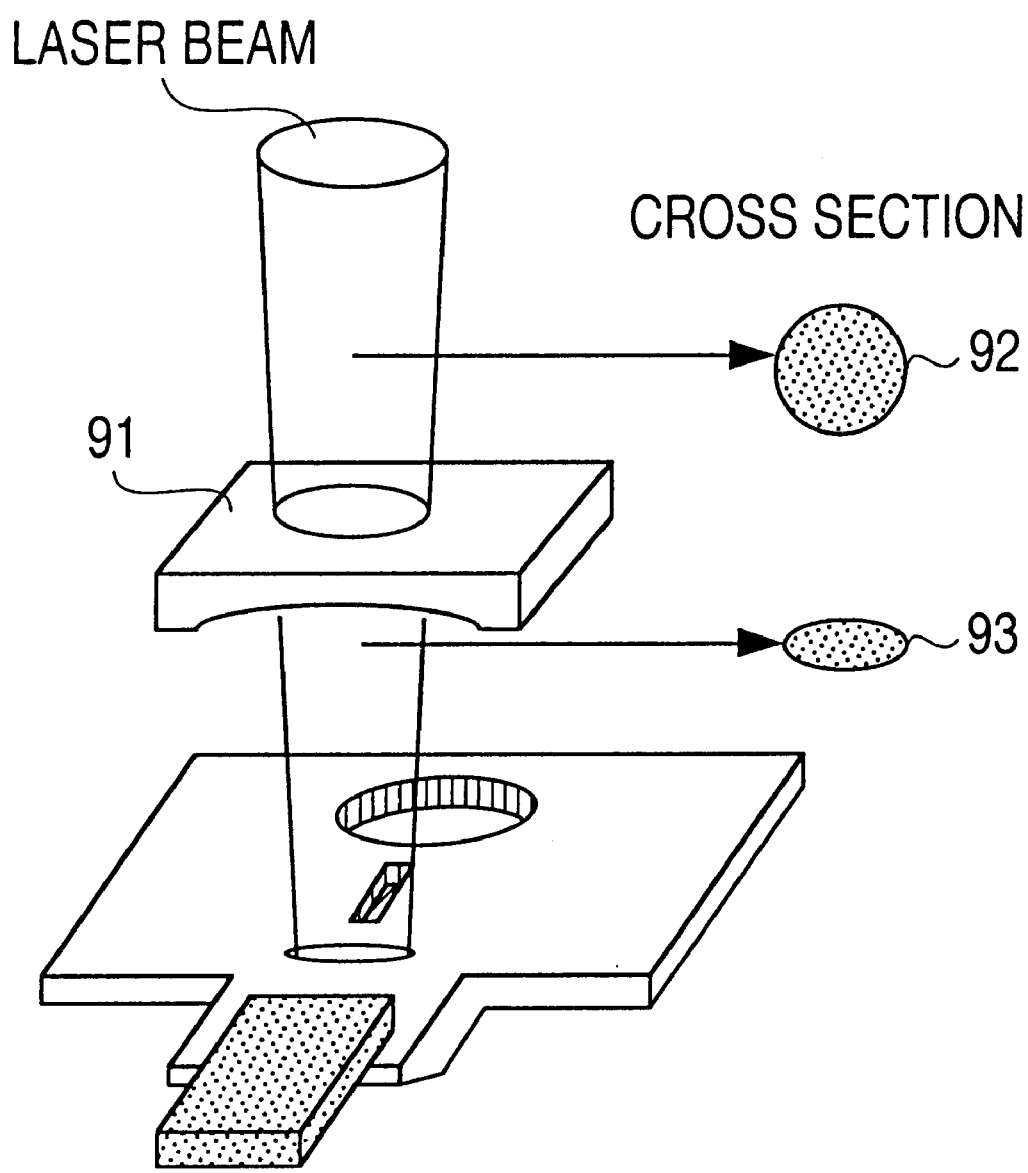
FIG. 10 is a diagram showing a flat sectional shape of a laser beam of the invention.

Further, as clear from the relation between the irradiation position and head position mentioned so far, when a cylindrical lens 91 is put before a head base 100 and the sectional shape 92 of the laser beam is an elliptical shape 93 as shown in FIG. 10, the head height can be adjusted without varying the azimuth angle.

The invention has been described in detail with reference to the preferred embodiments, but it is understood that variations and modifications can be effected within the spirit and scope of the invention.

What is claimed is:

1. A rotary head which is adapted to be mounted on a rotary drum of a magnetic recording/reproducing apparatus, and which comprises:
   a head base which is a single metal plate having at a specified area thereon a thermally caused plastic deformation area, said head base being bent in a direction parallel to a rotation axis of said rotary head at a boundary of said plastic deformation area; and
   at least one head chip bonded on said head base at a position defined by a bent amount of said head base.

2. A rotary head which is adapted to be mounted on a rotary drum of a magnetic recording/reproducing apparatus, and which comprises:
   a head base which is a single metal plate base having formed at a specified area thereon a groove which has a bottom surface, said bottom surface having a thermally caused plastic deformation area, and said head base being bent in a direction parallel to a rotation axis of said rotary head at a boundary of said plastic deformation area; and
   at least one head chip bonded on said head base at a position defined by a bent amount of said head base.

3. A rotary head comprising:
   a single piece metal plate having opposite first and second principal surfaces, an outer side edge, and a mounting area at which said single metal plate is mountable to a rotary drum of a magnetic recording/reproducing apparatus so as to define a longitudinal axis of said single piece metal plate extending radially from a rotational axis of said rotary drum; and, at least one head chip attached to said first principal surface of said single piece metal plate so as to extend beyond said outer side edge of said single piece metal plate;

said single piece metal plate being plastically bent along at least one thermal plastic deformation boundary line which extends normal to said longitudinal axis of said single piece metal plate and which is interposed between said outer side edge and said mounting area such that said single piece metal plate substantially extends in two different intersecting planes on each respective side of thermal plastic deformation line.

4. A rotary head as claimed in claim 3, wherein at least one of said first and second principal surfaces of said single piece metal plate includes a groove formed therein such that a thickness of said single piece metal plate is reduced along said groove, and wherein said groove extends across said thermal plastic deformation boundary line.

5. A rotary head as claimed in claim 4, wherein said groove is formed in at least said first principal surface of said single piece metal plate, and wherein said single piece metal plate is bent in a direction from said first principal surface to said second principal surface along said thermal plastic deformation boundary line.

* * * * *